Feb. 21, 1961 C. B. SIPE 2,972,414
PAN COVER HOLDER
Filed Jan. 28, 1960
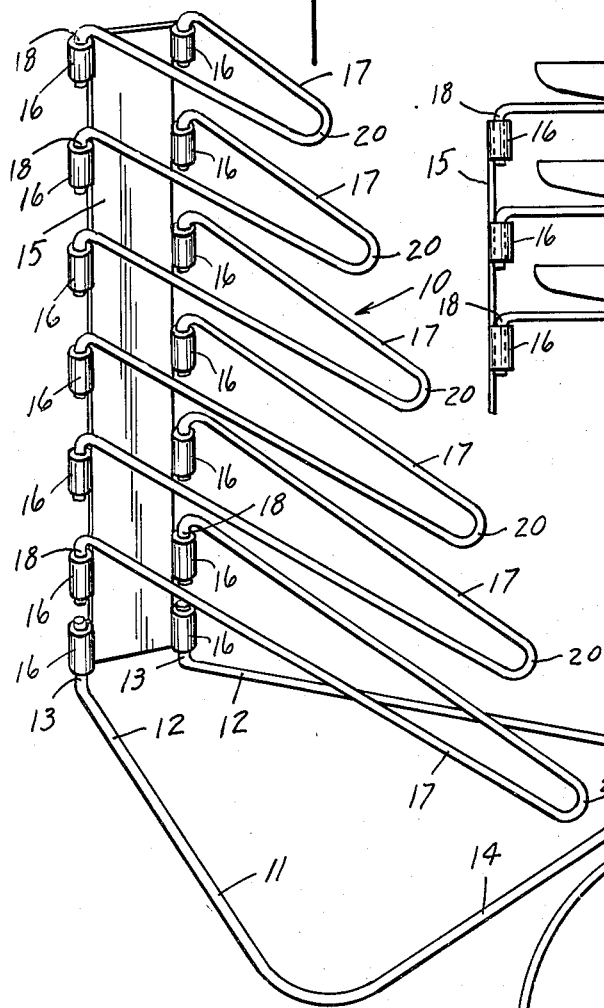
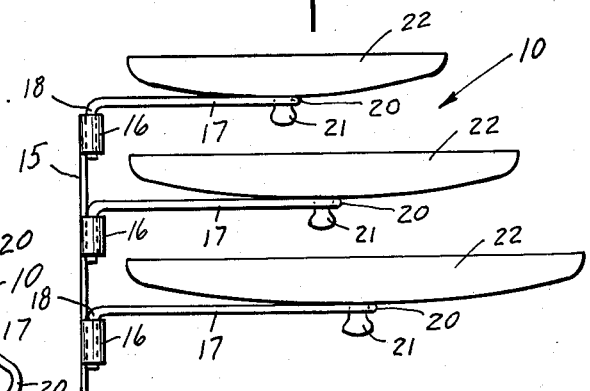
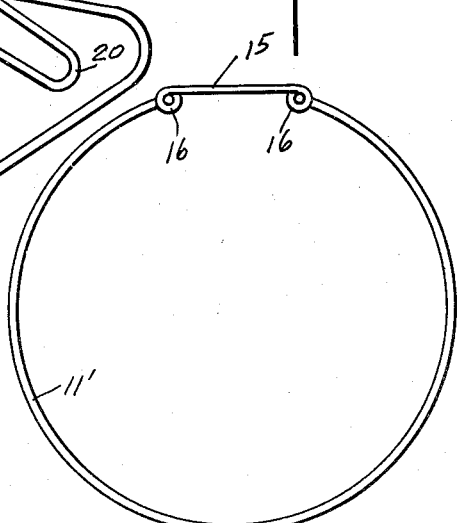
INVENTOR.
CHARLES B. SIPE.
BY
Lockwood, Woodard, Smith & Weikart
ATTORNEYS.

2,972,414
Patented Feb. 21, 1961

2,972,414
PAN COVER HOLDER

Charles B. Sipe, 903 Electric Bldg., Indianapolis, Ind.

Filed Jan. 28, 1960, Ser. No. 5,164

2 Claims. (Cl. 211—13)

The present invention relates to a rack or holder and finds primary utility as a holder for pan covers.

In the present-day kitchen the storing of pot and pan covers is in many cases accomplished by placing the covers in a drawer or cabinet. Because of the fact that the covers are usually provided with handles located concentrically of the covers which provide irregular shapes and contours, it is difficult to stack the covers in an orderly fashion. Such covers can be placed in a drawer; however, frequently the desired cover will be the one at the bottom of the drawer, necessitating the removal of all of the covers from the drawer.

It is, therefore, an object of the present invention to provide an improved rack or holder which is durable and inexpensive to manufacture and is capable of holding pot and pan covers so that they are easily accessible.

A further object of the present invention is to provide a rack or holder which supports the cover securely and so that they provide a neat, orderly appearance.

Related objects and advantages will appear as the description proceeds.

In accordance with the present invention, there is provided a holder including a supporting element and a plurality of loops extending from the supporting element. The loops are arranged so as to curve smoothly from their proximal portions and to curve more sharply at their extending ends. Pot and pan covers are placed within the holder by inserting the handles of the covers into the loops and drawing the covers toward the distal ends of the loops whereby the handles of the covers are retained by the sharply curving shape of the loop ends.

The full nature of the invention will be understood from the accompanying drawings and the following description and claims.

Fig. 1 is a perspective view of a pot and pan cover holder embodying the present invention.

Fig. 2 is a fragmentary side elevation of the uppermost portion of the holder of Fig. 1.

Fig. 3 is a plan view of an alternative form of base for the holder of Fig. 1 showing certain portions of the holder of Figs. 1 and 2 mounted thereon.

Referring now to the drawings, this invention comprises a rack or holder 10 having a base 11 consisting of wire or rod material which is formed in the shape of a loop having converging end portions 12 which terminate in upturned projections 13. It should be noted that the base 11 has a relatively greater lateral dimension at its extending portion 14 as a result of the converging end portions 12 whereby the base provides a stable support for the rack.

A flat elongated supporting element 15 is fixed by one end to the base 11 so as to extend generally perpendicularly upwardly therefrom. The supporting element 15 is provided with a plurality of cylindrical portions 16, the lowermost of which receive the upturned ends 13 of the base for fixing the supporting element to the base. A plurality of generally parabolic shaped loops 17 are formed of wire or rod material and are provided with downturned ends 18 which are received within the remaining cylindrical portions 16 for fixing the loops 17 to the supporting element. The loops 17 are arranged in spaced parallel tiers and in parallel relation to the base 11, the lowermost of the plurality of loops extending the greatest distance from the supporting element and the remainder of said plurality of loops extending progressively lesser distances from said supporting element according to their spacing from the base.

As can be seen from the drawing, each of the loops defines at its extending end a bight 20 which is of sufficiently sharp curvature so as to retain the handle 21 of a pan cover. The covers 22 are stacked upon the rack or holder 10 by projecting the handles 21 downwardly through the loops at a point spaced from the distal ends of the loops and by drawing the pan covers toward the distal ends so that the bights 20 retain the handles securely. The pan covers are removed from the rack by reversing the above described operation. Because of the fact that the various loops extend varying distances from the supporting element 15, the rack is better able to accommodate pot and pan covers of various sizes.

It should be understood that the present rack or holder may be positioned upon a horizontal surface. Alternatively, the base 11 may be mounted upon a wall or other vertical surface in such a manner that the loops 17 project downwardly. Of course, various other angles of mounting may also be accomplished.

Referring to Fig. 3, an alternative base 11' for the holder is illustrated and comprises a generally circular loop having upturned ends similar to the ends 13. The base 11' functions similarly to the base 11.

From the above description, it will be obvious that the present invention provides an improved rack or holder which is durable and inexpensive to manufacture and is capable of holding pot and pan covers so that they are easily accessible. It will also be obvious that the present invention provides a rack or holder which supports the covers securely and in such a manner that they provide a neat and orderly appearance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A pan cover holder comprising a rigid loop having converging ends, a supporting element fixed to said loop at its converging ends and extending perpendicularly of said loop, a plurality of rigid loops fixed to said supporting element at their opposite ends so as to extend from said supporting element, said plurality of loops being arranged in spaced parallel planes which are parallel to said first mentioned loop, each of said plurality of loops defining at its extending end a bight which is of sufficiently sharp curvature to retain the handle of a pan cover.

2. A pan cover holder comprising a rigid loop having converging ends, a supporting element fixed to said loop at its converging ends and extending perpendicularly and upwardly of said loop, a plurality of rigid loops fixed at their opposite ends to said supporting element so as to extend from said supporting element over said first mentioned loop, said plurality of loops being arranged one above the other in spaced parallel planes which are parallel to said first mentioned loop, each of said plurality of loops defining at its extending end a bight which is of sufficiently sharp curvature to retain the handle of a pan cover, the loop of said plurality of loops which is closest to said first mentioned loop being proportioned to extend the farthest from said supporting element of said plurality of loops, the remainder of said plurality extending progressively lesser distances from said supporting element according to their spacing from said first mentioned loop.

References Cited in the file of this patent

UNITED STATES PATENTS

| | | |
|---|---|---|
| 383,092 | Baker | May 22, 1888 |
| 425,709 | Schilling | Apr. 15, 1890 |
| 1,065,000 | Sarter | June 17, 1913 |
| 1,986,486 | Swanson | Jan. 1, 1935 |
| 2,114,735 | Crilly | Apr. 19, 1938 |
| 2,165,654 | Rosenthal | July 11, 1939 |